(12) United States Patent
Cai

(10) Patent No.: US 10,493,530 B2
(45) Date of Patent: Dec. 3, 2019

(54) AUTOMOBILE MODEL PROCESSING DEVICE

(71) Applicant: Gang Wu, Pujiang County (CN)

(72) Inventor: Yujun Cai, Haining (CN)

(73) Assignee: Gang Wu, Pujiang County, Zhejian Province (CN)

( * ) Notice: Subject to any disclaimer, the term of this patent is extended or adjusted under 35 U.S.C. 154(b) by 0 days.

(21) Appl. No.: 16/232,096

(22) Filed: Dec. 26, 2018

(65) Prior Publication Data

US 2019/0126350 A1 May 2, 2019

(30) Foreign Application Priority Data

Jan. 25, 2018 (CN) .................. 2018 1 00710140

(51) Int. Cl.
| | |
|---|---|
| *B29C 64/20* | (2017.01) |
| *B29C 64/227* | (2017.01) |
| *B22F 3/24* | (2006.01) |
| *B33Y 30/00* | (2015.01) |
| *B22F 3/105* | (2006.01) |
| *G01M 9/08* | (2006.01) |

(52) U.S. Cl.
CPC .............. *B22F 3/24* (2013.01); *B22F 3/1055* (2013.01); *B33Y 30/00* (2014.12); *B22F 2003/1056* (2013.01); *B22F 2003/1059* (2013.01); *B22F 2003/247* (2013.01); *G01M 9/08* (2013.01)

(58) Field of Classification Search
CPC .......... B29C 64/00; B33Y 30/00; B33Y 50/02
USPC ........................................................ 425/375
See application file for complete search history.

(56) References Cited

U.S. PATENT DOCUMENTS

| | | | |
|---|---|---|---|
| 9,481,133 B2* | 11/2016 | Carbone | ............... B29C 64/106 |
| 2013/0189435 A1* | 7/2013 | Mackie | ................ B29C 64/106 |
| | | | 427/256 |
| 2014/0361464 A1 | 12/2014 | Holcomb | |
| 2016/0288207 A1* | 10/2016 | Gambardella | ........ B22F 3/1055 |

(Continued)

FOREIGN PATENT DOCUMENTS

| | | |
|---|---|---|
| CN | 103921443 | 7/2014 |
| CN | 204431736 | 7/2015 |

(Continued)

OTHER PUBLICATIONS

First Action on the Merits for Chinese Counterpart Application 2018100710140 Mail Date Aug. 22, 2018.

(Continued)

*Primary Examiner* — Joseph S Del Sole
*Assistant Examiner* — Thu Khanh T Nguyen

(57) ABSTRACT

This invention discloses an automobile model processing device, comprising a support placed on the ground, a first base extending to one side fixedly arranged at upper side of one end of the support, a transmission cavity arranged in the first base, and a rotation cavity with the opening facing downwards fixedly arranged in the lower end face of the first base. One side of one end wall of said transmission cavity is fixedly provided with a first motor. The first motor starts to work to drive a driving pulley to rotate, and then a driven pulley in power connection with the driving pulley through a belt is rotated so that a worm is rotated, and as the worm is engaged with a worm wheel, the rotation of the worm wheel drives the spindle to rotate.

4 Claims, 2 Drawing Sheets

(56) References Cited

U.S. PATENT DOCUMENTS

2016/0325498 A1* 11/2016 Gelbart ................ B29C 64/106
2017/0151713 A1*  6/2017 Steele ................ B29C 67/0055
2017/0232680 A1*  8/2017 Skogsrud ................ B29C 64/20
                                                             425/140
2018/0056446 A1*  3/2018 Mezawa ................ B33Y 30/00

FOREIGN PATENT DOCUMENTS

| CN | 105128329 | 12/2015 |
| CN | 204869691 | 12/2015 |
| CN | 105619817 |  6/2016 |
| CN | 105984150 | 10/2016 |
| CN | 206154730 |  5/2017 |
| CN | 206169292 |  5/2017 |

OTHER PUBLICATIONS

Notification of Grant Application for Chinese Counterpart Application 2018100710140 dated Sep. 27, 2018.

\* cited by examiner

AUTOMOBILE MODEL PROCESSING DEVICE

CROSS-REFERENCES TO RELATED APPLICATIONS

The present application claims priority from Chinese application No. 2018100710140 filed on 2018 Jan. 25 which is hereby incorporated by reference in its entirety.

TECHNICAL FIELD

The invention relates to the field of automobile model processing, in particular to an automobile model processing device.

BACKGROUND OF THE INVENTION

With the development of science and technology and social progress, China has been promoting the development of high-tech. In the field of automobile model processing, in traditional processing methods blank materials are processed by multiple machine tools working together to form a complete automobile model, but there are special requirements for the shape and size of blank materials and will cause the waste of blank materials. The mixed metal powder is sintered and formed by laser used by this device, and corresponding automobile model is processed according to three-dimensional model in the program.

BRIEF SUMMARY OF THE INVENTION

The aim of the invention is to provide an automobile model processing device so as to overcome the problems existing in the prior art.

According to the present invention, an automobile model processing device of the present invention comprises a support placed on the ground, wherein a first base extending to one side is fixedly arranged at upper side of one end of said support, wherein a transmission cavity is arranged in said first base, and a rotation cavity with the opening facing downwards is fixedly arranged in the lower end face of said first base, and one side of one end wall of said transmission cavity is fixedly provided with a first motor, wherein one end of the output axis of said first motor is rotatably mounted in the other end wall of said transmission cavity, and a driving pulley is arranged at and in power connection with the output axis of said first motor, wherein a worm in said transmission cavity and in rotatable connection with the end walls of said transmission cavity, is arranged on one side of said driving pulley, wherein a driven pulley flush with said driving pulley is arranged on and in power connection with axis outer surface of one end of said worm. A belt is wound around the outer surface of said driven pulley, wherein said belt winds around outer surface of said driving pulley and connects said driving pulley with said driven pulley in a power mode, and a spindle extending downwards is rotatably arranged between upper and lower inner walls of one side of said transmission cavity, and a worm wheel in said transmission cavity is arranged on and in power connection with outer surface of said spindle, wherein said worm wheel is engaged with said worm, and said spindle rotatably penetrates through the lower end face of said transmission cavity and then extends into said rotation cavity, and a first revolving shaft in rotational engagement with the end walls of said rotation cavity is arranged on and in power connection with the lower end face of said spindle, wherein a second base in an exterior space is fixedly arranged at the lower end face of said first revolving shaft, wherein a first opening cavity communicating from one side to the other with the opening facing downwards is arranged in said second base. Two sets of first polished rods are fixedly arranged between the end walls of said first opening cavity, wherein a laser head extending downwards is slidably arranged on the outer surfaces of said first polished rods A. A second motor is fixedly arranged in one side of the lower end face of said second base, wherein the output axis of said second motor extends downwards and is in power connection with a driving synchronous pulley which is in the exterior space, and the other side of the lower end face of said second base is fixedly provided with a second revolving shaft extending downwards, wherein a driven synchronous pulley in the exterior space is rotatably arranged on the outer surface of said revolving shaft, and the outer circumference of said driven synchronous pulley is wound by a synchronous belt, wherein said synchronous belt penetrates through said laser head and winds around the outer circumference of said driving synchronous pulley and said synchronous belt connects said driving synchronous pulley with said driven synchronous pulley in a power mode, wherein the section of one side of said synchronous belt is fixed to said laser head and the section of the other side of said synchronous belt is far away from said laser head and said synchronous belt does not touch said laser head, and the lower side of one end face of said support is fixedly provided with a third base extending to one side. A second opening cavity with the opening facing upwards is arranged in the upper end face of said third base. A first inner cavity is arranged in the lower end of said third base, and a fourth base which is fixedly connected with one end face of said third base in a matching mode, is communicated with and arranged in the upper side of one end wall of said second opening cavity, wherein a second inner cavity with the opening facing to one side is fixedly arranged in said fourth base. A cylinder is fixedly arranged in the second inner cavity, wherein one end face of the output axis of said cylinder is fixedly provided with a push plate which is slidable, and a powder tube extending upwards into the exterior space is communicated with and arranged in one side of upper end wall of the second inner cavity, and a lifting block in sliding fit connection with the end walls of said second opening cavity is arranged between the end walls of said second opening cavity, wherein one side of the lower end face of said lifting block is fixedly provided with a second polished rod extending downwards, and said second polished rod slidably and successively penetrates through said second opening cavity and said first inner cavity and then extends into the exterior space, and the other side of the lower end face of said lifting block is fixedly provided with a threaded shaft extending downwards, and said threaded shaft slidably and successively penetrates through said second opening cavity and said first inner cavity, wherein the outer surface of the end extending downwards of said threaded shaft is in threaded connection with an internally threaded post, wherein said internally threaded post is rotatably arranged in the lower end wall of said second opening cavity and extends downwards into said first inner cavity, and the outer surface of the section extending downwards of said internally threaded post is in power connection with a driven gear arranged in said first inner cavity, and a driving gear which is in said first inner cavity and engaged with said driven gear, is arranged at one side of said driven gear. A third motor is fixedly arranged in one side of upper end wall of said first inner cavity, wherein the output axis of said third motor extends into said first inner cavity and is in power connection with said driving gear, and a ventilation assembly is arranged in said transmission cavity, wherein said ventilation assembly comprises a ventilation slot which is communicated with the exterior space and arranged in one end wall of said transmission cavity and an air inlet hole arranged in one side of top wall of said transmission cavity, wherein said ventilation slot is fixedly provided with a ventilation fan, and the outer surface of said first motor is fixedly provided with a heat dissipating patch, wherein the outer surface of said heat dissipating patch is provided with heat dissipating fins, wherein heat dissipating holes which are communicated from upside to downside are arranged on said heat dissipating fins, thus the heat generated by said first motor during operation can be dissipated acceleratedly through the ventilation fan so as to prevent heat from accumulating on said first motor.

In a further technical proposal, the upper extending section of said spindle is in rotational engagement with the upper end wall of said transmission cavity through a thrust ball bearing, and the diameter of upper end section, which is in the exterior space, of said spindle is greater than the diameter of lower extending section of said spindle. Thus, said spindle can be limited and will not move so that said spindle can rotate stably to effectively improve the operation stability of the device.

In a further technical proposal, the lower extending section of said first revolving shaft is in rotational engagement with the end walls of said rotation cavity through the thrust ball bearing, wherein the diameter of extending section the upper side of said first revolving shaft is smaller than the diameter of lower extending section of said first revolving shaft, so that said spindle is further limited to further improve the operation stability of the device.

In a further technical proposal, an electronic control valve and a containing cavity which can contain mixed metal powder are arranged in said powder tube, and metal powder and sintered catalysts are contained in the mixed metal powder, so the mixed metal powder can be added into the containing cavity and the falling of the mixed metal powder can be controlled by the electronic control valve, which improves the reliability of the device.

In a further technical proposal, the outer surface of said lifting block fits tightly with the inner wall of said second opening cavity, thus, the metal powder is accumulated on the upper end face of said lifting block and will not leak down from said second opening cavity, so operation stability of the device can be improved.

The benefits of the invention are as follows:

When the present invention is in the initial state, the push rod of said cylinder is at the end-most position, and at this time said push plate is located below said lifting block, and the upper end face of said lifting block is flush with the lower end wall of said cylinder, and said laser head is located at the center of the first opening cavity. Thus, when the device is not in operation, the motion structure of the device can be returned to the initial state, and the device can be quickly adjusted in operation to effectively improve the flexibility of the device.

When the device is running, said powder tube starts to work to place the mixed metal powder into the second inner cavity of said fourth base, and said cylinder starts to work to drive said push plate to push the mixed metal powder to one side, and a layer is tiled on the upper end face of said lifting block, and said first motor starts to work to drive said driving pulley to rotate, and then the driven pulley in power connection with said driving pulley through said belt is rotated, thus, said worm is rotated. As said worm is engaged with said worm wheel, the rotation of said worm wheel drives said spindle to rotate, and the first revolving shaft fixed with said spindle starts to rotate together with the second base fixedly arranged below said first revolving shaft, and said second motor works to drive said driving synchronous pulley to rotate, so the driven synchronous pulley in power connection with said driving synchronous pulley through said synchronous belt is rotated. Said laser head sliding on said first polished rods slides side to side under the action of said synchronous belt, then the laser head performs laser sintering on the upper end face of said lifting block according to the graphical coordinates of the model slice in the program. After this step, said third motor works, and said driving gear in power connection with said third motor is rotated, and then the driven gear engaged with said driving gear is rotated, and said internally threaded post fixed with said driven gear rotates synchronously. Said threaded shaft arranged in and in threaded fit connection with said internally threaded post slides downwards in said internally threaded post, so the lifting block is driven to slide downwards, and the same steps of covering the upper end of said lifting block with mixed metal powder are performed, and then the same sintering steps are performed. After these steps are performed repeatedly, a complete automobile model is sintered, which can be taken out and placed in the baking box for further molding. In this way, the automobile model can be printed by laser sintering with high precision, so the technology level of the device can be effectively improved.

When the automobile model is printed, the automobile model is taken out from said second opening cavity, then said third motor is driven to move said lifting block upwards, and the metal powder in said second opening cavity is recycled, so the cost of using this device can be reduced.

The device is simple in structure and convenient to use. Metal mixtures are heated and molded by laser sintering adopted by this device and corresponding automobile model is processed according to the three-dimensional model in the program.

The above is only the specific embodiment of the invention, but the scope of the invention is not limited thereto, and any changes or substitutions without the creative work should be included in the claimed protection extent of this invention. Therefore, the claimed protection extent of the invention shall be determined with reference to the appended claims.

BRIEF DESCRIPTIONS OF THE DRAWINGS

For better explanation of the technical proposal in the present invention embodiments or the prior art, the drawings to be used in the description of the embodiments or the prior art will be briefly described below. Obviously, the drawings in the following description are only some embodiments of the present invention. For those common technicians in this field, other drawings may also be obtained based on these drawings without any creative work.

DETAILED DESCRIPTION OF THE INVENTION

All of the features disclosed in this specification, or all of the methods or procedures in the process disclosed, may be combined in any way other than mutually exclusive features and/or steps.

Any feature disclosed in this specification may be replaced by other equivalent or alternative features with similar purposes, unless otherwise stated. That is, unless otherwise stated, each feature is just one example of a series of equivalent or similar features.

Figure 1:
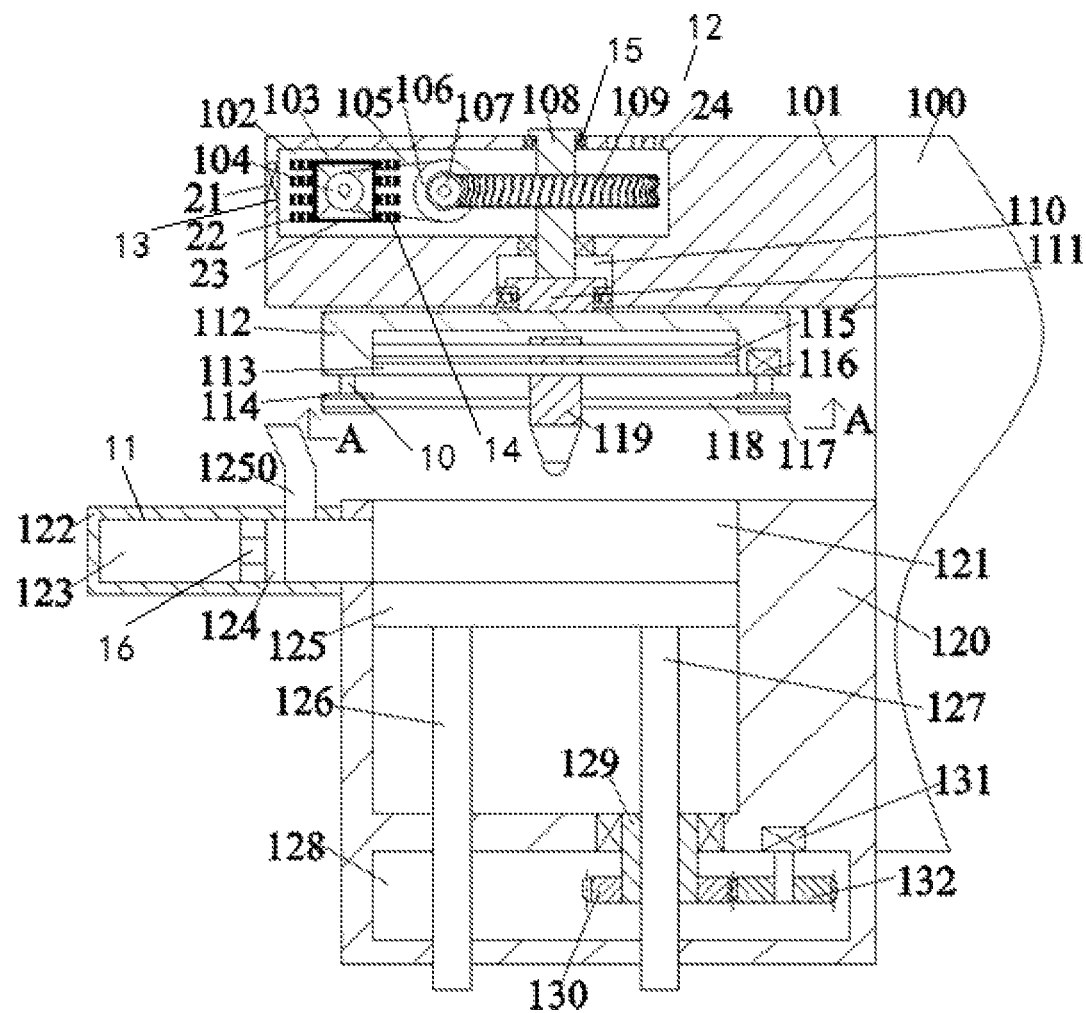
FIG. 1 is the overall structural schematic diagram of an automobile model processing device in this invention.
Figure 2:
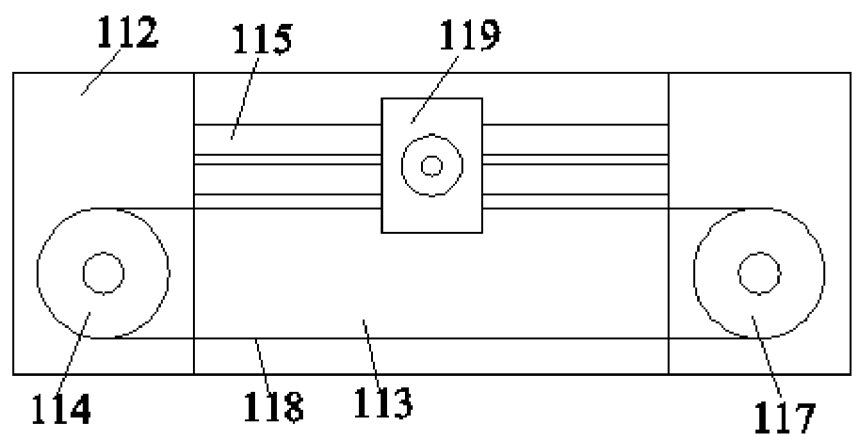
FIG. 2 is a schematic diagram along A-A direction in FIG. 1.

Referring to FIG. 1-2, an automobile model processing device of the present invention comprises a support 100 placed on the ground, wherein a first base 101 extending to one side is fixedly arranged at upper side of one end of said support 100, wherein a transmission cavity 102 is arranged in said first base 101, and a rotation cavity 110 with the opening facing downwards is fixedly arranged in the lower end face of said first base 101, and one side of one end wall of said transmission cavity 102 is fixedly provided with a first motor 103, wherein one end of the output axis of said first motor 103 is rotatably mounted in the other end wall of said transmission cavity 102, and a driving pulley 104 is arranged at and in power connection with the output axis of said first motor 103, wherein a worm 107 in said transmission cavity 102 and in rotational engagement with the end walls of said transmission cavity 102, is arranged on one side of said driving pulley 104, wherein a driven pulley 106 flush with said driving pulley 104 is arranged on and in power connection with axis outer surface of one end of said worm 107. A belt 105 is wound around the outer surface of said driven pulley 106, wherein said belt 105 winds around outer surface of said driving pulley 104 and connects said driving pulley 104 with said driven pulley 106 in a power mode, and a spindle 108 extending downwards is rotatably arranged between upper and lower inner walls of one side of said transmission cavity 102, and a worm wheel 109 in said transmission cavity 102 is arranged on and in power connection with outer surface of said spindle 108, wherein said worm wheel 109 is engaged with said worm 107, and said spindle 108 rotatably penetrates through the lower end face of said transmission cavity 102 and then extends into said rotation cavity 110, and a first revolving shaft 111 in rotational engagement with the end walls of said rotation cavity 110 is arranged on and in power connection with the lower end face of said spindle 108, wherein a second base 112 in an exterior space is fixedly arranged at the lower end face of said first revolving shaft 111, wherein a first opening cavity 113 communicating from one side to the other with the opening facing downwards is arranged in said second base 112. Two sets of first polished rods 115 are fixedly arranged between the end walls of said first opening cavity 113, wherein a laser head 119 extending downwards is slidably arranged on the outer surfaces of said first polished rods 115. A second motor 116 is fixedly arranged in one side of the lower end face of said second base 112, wherein the output axis of said second motor 116 extends downwards and is in power connection with a driving synchronous pulley 117 which is in the exterior space, and the other side of the lower end face of said second base 112 is fixedly provided with a second revolving shaft 10 extending downwards, wherein a driven synchronous pulley 114 in the exterior space is rotatably arranged on the outer surface of said second revolving shaft 10, and the outer circumference of said driven synchronous pulley 114 is wound by a synchronous belt 118, wherein said synchronous belt 118 penetrates through said laser head 119 and winds around the outer circumference of said driving synchronous pulley 117 and said synchronous belt 118 connects said driving synchronous pulley 117 with said driven synchronous pulley 114 in a power mode, wherein the section of one side of said synchronous belt 118 is fixed to said laser head 119 and the section of the other side of said synchronous belt 118 is far away from said laser head 119 and said synchronous belt 118 does not touch said laser head 119, and the lower side of one end face of said support 100 is fixedly provided with a third base 120 extending to one side. A second opening cavity 121 with the opening facing upwards is arranged in the upper end face of said third base 120. A first inner cavity 128 is arranged in the lower end of said third base 120, and a fourth base 122 which is fixedly connected with one end face of said third base 120 in a matching mode, is communicated with and arranged in the upper side of one end wall of said second opening cavity 121, wherein a second inner cavity 11 with the opening facing to one side is fixedly arranged in said fourth base 122. A cylinder 123 is fixedly arranged in the second inner cavity 11, wherein one end face of the output axis of said cylinder 123 is fixedly provided with a push plate 124 which is slidable, and a powder tube 1250 extending upwards into the exterior space is communicated with and arranged in one side of upper end wall of the second inner cavity 11, and a lifting block 125 in sliding fit connection with the end walls of said second opening cavity 121 is arranged between the end walls of said second opening cavity 121, wherein one side of the lower end face of said lifting block 125 is fixedly provided with a second polished rod 126 extending downwards, and said second polished rod 126 slidably and successively penetrates through said second opening cavity 121 and said first inner cavity 128 and then extends into the exterior space, and the other side of the lower end face of said lifting block 125 is fixedly provided with a threaded shaft 127 extending downwards, and said threaded shaft 127 slidably and successively penetrates through said second opening cavity 121 and said first inner cavity 128, wherein the outer surface of the end extending downwards of said threaded shaft 127 is in threaded connection with an internally threaded post 129, wherein said internally threaded post 129 is rotatably arranged in the lower end wall of said second opening cavity 121 and extends downwards into said first inner cavity 128, and the outer surface of the section extending downwards of said internally threaded post 129 is in power connection with a driven gear 130 arranged in said first inner cavity 128, and a driving gear 132 which is in said first inner cavity 128 and engaged with said driven gear 130, is arranged at one side of said driven gear 130. A third motor 131 is fixedly arranged in one side of upper end wall of said first inner cavity 128, wherein the output axis of said third motor 131 extends into said first inner cavity 128 and is in power connection with said driving gear 132, and a ventilation assembly 12 is arranged in said transmission cavity 102, wherein said ventilation assembly 12 comprises a ventilation slot 13 which is communicated with the exterior space and arranged in one end wall of said transmission cavity 102 and an air inlet hole 24 arranged in one side of top wall of said transmission cavity 102, wherein said ventilation slot 13 is fixedly provided with a ventilation fan 21, and the outer surface of said first motor 103 is fixedly provided with a heat dissipating patch 23, wherein the outer surface of said heat dissipating patch 23 is provided with heat dissipating fins 22, wherein heat dissipating holes 14 which are communicated from upside to downside are arranged on said heat dissipating fins 22, thus the heat generated by said first motor 103 during operation can be dissipated acceleratedly through the ventilation fan 21 so as to prevent heat from accumulating on said first motor 103.

Helpfully, wherein the upper extending section of said spindle 108 is in rotational engagement with the upper end wall of said transmission cavity 102 through a thrust ball bearing 15, and the diameter of the upper end section, which is in the exterior space, of said spindle 108 is greater than the diameter of lower extending section of said spindle 108. Thus, said spindle 108 can be limited and will not move so that said spindle 108 can rotate stably to effectively improve the operation stability of the device.

Helpfully, wherein the lower extending section of said first revolving shaft 111 is in rotational engagement with the end walls of said rotation cavity 110 through the thrust ball bearing, wherein the diameter of extending section of the upper side of said first revolving shaft 111 is smaller than the diameter of lower extending section of said first revolving shaft 111, so that said spindle 108 is further limited to further improve the operation stability of the device.

Helpfully, wherein an electronic control valve and a containing cavity which can contain mixed metal powder are arranged in said powder tube 1250, and metal powder and sintered catalysts are contained in the mixed metal powder, so the mixed metal powder can be added into the containing cavity and the falling of the mixed metal powder can be controlled by the electronic control valve, which improves the reliability of the device.

Helpfully, wherein the outer surface of said lifting block 125 fits tightly with the inner wall of said second opening cavity 121, thus, the metal powder is accumulated on the upper end face of said lifting block 125 and will not leak down from said second opening cavity 121, so operation stability of the device can be improved.

When the present invention is in the initial state, the push rod 16 of said cylinder 123 is at the end-most position, and at this time said push plate 124 is located below said lifting block 125, and the upper end face of said lifting block 125 is flush with the lower end wall of said cylinder 123, and said laser head 119 is located at the center of the first opening cavity 113.

When the device is running, said powder tube 1250 starts to work to place the mixed metal powder into the second inner cavity 11 of said fourth base 122, and said cylinder 123 starts to work to drive said push plate 124 to push the mixed metal powder to one side, and a layer is tiled on the upper end face of said lifting block 125, and said first motor 103 starts to work to drive said driving pulley 104 to rotate, and then the driven pulley 106 in power connection with said driving pulley 104 through said belt 105 is rotated, thus, said worm 107 is rotated. As said worm 107 is engaged with said worm wheel 109, the rotation of said worm wheel 109 drives said spindle 108 to rotate, and the first revolving shaft 111 fixed with said spindle 108 starts to rotate together with the second base 112 fixedly arranged below said first revolving shaft 111, and said second motor 116 works to drive said driving synchronous pulley 117 to rotate, so the driven synchronous pulley 114 in power connection with said driving synchronous pulley 117 through said synchronous belt 118 is rotated. Said laser head 119 sliding on said first polished rods 115 slides side to side under the action of said synchronous belt 118, and then the laser head 119 performs laser sintering on the upper end face of said lifting block 125 according to the graphical coordinates of the model slice in the program. After this step, said third motor 131 works, and said driving gear 132 in power connection with said third motor 131 is rotated, and then the driven gear 130 engaged with said driving gear 132 is rotated, and said internally threaded post 129 fixed with said driven gear 130 rotates synchronously. Said threaded shaft 127 arranged in and in threaded fit connection with said internally threaded post 129 slides downwards in said internally threaded post 129, so the lifting block 125 is driven to slide downwards, and the same steps of covering the upper end of said lifting block 125 with mixed metal powder are performed, and then the same sintering steps are performed. After these steps are performed repeatedly, a complete automobile model is finally sintered, which can be taken out and placed in the baking box for further molding.

When the automobile model is printed, the automobile model is taken out from said second opening cavity 121, then said third motor 131 is driven to move said lifting block 125 upwards, and the metal powder in said second opening cavity 121 is recycled.

The benefits of the invention are as follows:

When the present invention is in the initial state, the push rod of said cylinder is at the end-most position, and at this time said push plate is located below said lifting block, and the upper end face of said lifting block is flush with the lower end wall of said cylinder, and said laser head is located at the center of the first opening cavity. Thus, when the device is not in operation, the motion structure of the device can be returned to the initial state, and the device can be quickly adjusted in operation to effectively improve the flexibility of the device.

When the device is running, said powder tube starts to work to place the mixed metal powder into the inner cavity of said fourth base, and said cylinder starts to work to drive said push plate to push the mixed metal powder to one side, and a layer is tiled on the upper end face of said lifting block, and said first motor starts to work to drive said driving pulley to rotate, and then the driven pulley in power connection with said driving pulley through said belt is rotated, thus, said worm is rotated. As said worm is engaged with said worm wheel, the rotation of said worm wheel drives said spindle to rotate, and the first revolving shaft fixed with said spindle starts to rotate together with the second base fixedly arranged below said first revolving shaft, and said second motor works to drive said driving synchronous pulley to rotate, so the driven synchronous pulley in power connection with said driving synchronous pulley through said synchronous belt is rotated. Said laser head sliding on said first polished rods slides side to side under the action of said synchronous belt, then the laser head performs laser sintering on the upper end face of said lifting block according to the graphical coordinates of the model slice in the program. After this step, said third motor works, and said driving gear in power connection with said third motor is rotated, and then the driven gear engaged with said driving gear is rotated, and said internally threaded post fixed with said driven gear rotates synchronously. Said threaded shaft arranged in and in threaded fit connection with said internally threaded post slides downwards in said internally threaded post, so the lifting block is driven to slide downwards, and the same steps of covering the upper end of said lifting block with mixed metal powder are performed, and then the same sintering steps are performed. After these steps are performed repeatedly, a complete automobile model is sintered, which can be taken out and placed in the baking box for further molding. In this way, the automobile model can be printed by laser sintering with high precision, so the technology level of the device can be effectively improved.

When the automobile model is printed, the automobile model is taken out from said second opening cavity, then said third motor is driven to move said lifting block upwards, and the metal powder in said second opening cavity is recycled, so the cost of using this device can be reduced.

The device is simple in structure and convenient to use. Metal mixtures are heated and molded by laser sintering adopted by this device and corresponding automobile model is processed according to the three-dimensional model in the program.

The above is only the specific embodiment of the present invention, but the protection scope of the present invention is not limited thereto, and any changes or substitutions without creative efforts shall fall within the protection scope of the present invention. Therefore, the claimed protection extent of the invention shall be determined with reference to the appended claims.

The invention claimed is:
1. An automobile model processing device, comprising:
a support placed on the ground;
a first base extending to one side fixedly arranged at an upper side of one end of said support;
a transmission cavity arranged in said first base;
a rotation cavity with an opening facing downwards fixedly arranged in a lower end face of said first base,
wherein one side of one end wall of said transmission cavity is fixedly provided with a first motor, and one end of an output axis of said first motor is rotatably mounted in the other end wall of said transmission cavity;
a driving pulley arranged at and in power connection with the output axis of said first motor;
wherein a worm in said transmission cavity and in rotatable connection with end walls of said transmission cavity, is arranged on one side of said driving pulley, and a driven pulley flush with said driving pulley is arranged on and in power connection with an axis outer surface of one end of said worm;
a belt wound around an outer surface of said driven pulley,
wherein said belt winds around an outer surface of said driving pulley and connects said driving pulley with said driven pulley in a power mode, and a spindle extending downwards is rotatably arranged between upper and lower inner walls of one side of said transmission cavity, and a worm wheel in said transmission cavity is arranged on and in power connection with an outer surface of said spindle,
wherein said worm wheel is engaged with said worm, and said spindle rotatably penetrates through a lower end face of said transmission cavity and then extends into said rotation cavity, and a first revolving shaft in rotational engagement with end walls of said rotation cavity is arranged on and in power connection with a lower end face of said spindle;
wherein a second base in an exterior space is fixedly arranged at a lower end face of said first revolving shaft;
whereby said first motor starts to work to drive said driving pulley to rotate, and then the driven pulley in power connection with said driving pulley through said belt is rotated, thus, said worm is rotated, and as said worm is engaged with said worm wheel, said spindle is driven by said worm wheel to rotate, and the first revolving shaft fixed with said spindle starts to rotate together with the second base fixedly arranged below said first revolving shaft;
wherein a first opening cavity communicating from one side to the other with an opening facing downwards is arranged in said second base;
two sets of first polished rods fixedly arranged between end walls of said first opening cavity,
wherein a laser head extending downwards is slidably arranged on an outer surface of said first polished rod;

a second motor fixedly arranged in one side of a lower end face of said second base;
wherein an output axis of said second motor extends downwards and is in power connection with a driving synchronous pulley which is in the exterior space, and the other side of the lower end face of said second base is fixedly provided with a second revolving shaft extending downwards;
wherein a driven synchronous pulley in the exterior space is rotatably arranged on an outer surface of said second revolving shaft, and an outer circumference of said driven synchronous pulley is wound by a synchronous belt;
wherein said synchronous belt penetrates through said laser head and winds around an outer circumference of said driving synchronous pulley and said synchronous belt connects said driving synchronous pulley with said driven synchronous pulley in a power mode,
wherein a section of one side of said synchronous belt is fixed to said laser head and a section of the other side of said synchronous belt is far away from said laser head and said synchronous belt does not touch said laser head;
whereby said second motor works to drive said driving synchronous pulley to rotate, so the driven synchronous pulley in power connection with said driving synchronous pulley through said synchronous belt is rotated, and said laser head sliding on said first polished rods slides side to side under action of said synchronous belt;
wherein a lower side of one end face of said support is fixedly provided with a third base extending to one side;
a second opening cavity with an opening facing upwards arranged in an upper end face of said third base,
wherein a first inner cavity is arranged in a lower end of said third base, and a fourth base, which is fixedly connected with one end face of said third base in a matching mode, is communicated with and arranged in an upper side of one end wall of said second opening cavity;
a second inner cavity with an opening facing to one side fixedly arranged in said fourth base;
a cylinder fixedly arranged in the second inner cavity,
wherein one end face of an output axis of said cylinder is fixedly provided with a push plate which is slidable, and a powder tube extending upwards into the exterior space is communicated with and arranged in one side of an upper end wall of the second inner cavity, wherein an electronic control valve and a containing cavity which can contain mixed metal powder are arranged in said powder tube, and the mixed metal powder is contained in the containing cavity, and metal powder and sintered catalysts are contained in the mixed metal powder, and said cylinder starts to work to drive said push plate to push the mixed metal powder to one side, and a lifting block in sliding fit connection with end walls of said second opening cavity is arranged between the end walls of said second opening cavity;
wherein one side of a lower end face of said lifting block is fixedly provided with a second polished rod extending downwards, and said second polished rod slidably and successively penetrates through said second opening cavity and said first inner cavity and then extends into the exterior space, and the other side of the lower end face of said lifting block is fixedly provided with a threaded shaft extending downwards;

wherein said threaded shaft slidably and successively penetrates through said second opening cavity and said first inner cavity, and an outer surface of an end extending downwards of said threaded shaft is in threaded connection with an internally threaded post, wherein said internally threaded post is rotatably arranged in a lower end wall of said second opening cavity and extends downwards into said first inner cavity, and an outer surface of a section extending downwards of said internally threaded post is in power connection with a driven gear arranged in said first inner cavity, and a driving gear, which is in said first inner cavity and engaged with said driven gear, is arranged at one side of said driven gear;

a third motor fixedly arranged in one side of the upper end wall of said first inner cavity, wherein an output axis of said third motor extends into said first inner cavity and is in power connection with said driving gear, whereby said third motor works, and said driving gear in power connection with said third motor is rotated, and then the driven gear engaged with said driving gear is rotated, and said internally threaded post fixed with said driven gear rotates synchronously, and said threaded shaft arranged in and in threaded fit connection with said internally threaded post slides downwards in said internally threaded post, so the lifting block is driven to slide downwards;

wherein a ventilation assembly is arranged in said transmission cavity;

wherein said ventilation assembly comprises a ventilation slot which is communicated with the exterior space and arranged in one end wall of said transmission cavity and an air inlet hole arranged in one side of a top wall of said transmission cavity, wherein said ventilation slot is fixedly provided with a ventilation fan, and an outer surface of said first motor is fixedly provided with a heat dissipating patch;

wherein an outer surface of said heat dissipating patch is provided with heat dissipating fins, and heat dissipating holes which are communicated from upside to downside are arranged on said heat dissipating fins, thus the heat generated by said first motor during operation can be dissipated acceleratedly through the ventilation fan so as to prevent heat from accumulating on said first motor.

2. The automobile model processing device as defined in claim 1, wherein an upper extending section of said spindle is in rotational engagement with an upper end wall of said transmission cavity through a thrust ball bearing, and diameter of the upper end section, which is in the exterior space, of said spindle is greater than diameter of a lower extending section of said spindle.

3. The automobile model processing device as defined in claim 1, wherein a lower extending section of said first revolving shaft is in rotational engagement with end walls of said rotation cavity through the thrust ball bearing, wherein diameter of an extending section of an upper side of said first revolving shaft is smaller than diameter of the lower extending section of said first revolving shaft.

4. The automobile model processing device as defined in claim 1, wherein an outer surface of said lifting block fits tightly with an inner wall of said second opening cavity.

* * * * *